(12) United States Patent
Suzuki

(10) Patent No.: US 6,349,927 B1
(45) Date of Patent: Feb. 26, 2002

(54) FLUID-FILLED VIBRATION DAMPING DEVICE HAVING ACTUATOR AND METHOD OF MANUFACTURING THE SAME

(75) Inventor: Tatsuya Suzuki, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/515,419

(22) Filed: Feb. 29, 2000

(30) Foreign Application Priority Data

Mar. 9, 1999 (JP) .......................................... 11-061765

(51) Int. Cl.$^7$ ................................................ F16F 5/00
(52) U.S. Cl. ................................... 267/140.13; 267/219
(58) Field of Search ........................ 267/140.3, 140.13, 267/140.14, 141.2, 141.6, 219; 248/562, 636; 180/300

(56) References Cited

U.S. PATENT DOCUMENTS

| 4,237,771 A | * | 12/1980 | Frankenberg ................. 91/387 |
| 4,756,513 A | * | 7/1988 | Carlson et al. ........... 267/140.1 |
| 4,764,152 A | * | 8/1988 | Jorg et al. .................... 464/89 |
| 4,802,658 A | * | 2/1989 | Ushijima et al. ......... 267/140.1 |
| 4,889,325 A | * | 12/1989 | Flower et al. ............ 267/140.1 |
| 5,176,368 A | * | 1/1993 | Shtarkman ............. 267/140.14 |
| 5,180,148 A | * | 1/1993 | Muramatsu ............ 267/140.14 |
| 5,407,169 A | * | 4/1995 | Tournier ..................... 248/550 |
| 5,620,168 A | * | 4/1997 | Ohtake et al. .......... 267/140.13 |
| 5,632,472 A | * | 5/1997 | Kato et al. ............. 267/140.13 |
| 5,639,073 A | * | 6/1997 | Suzuki et al. .......... 267/140.13 |
| 5,642,873 A | * | 7/1997 | Kato ...................... 267/140.14 |
| 5,645,138 A | * | 7/1997 | Tajima et al. ................ 180/300 |
| 5,769,402 A | * | 6/1998 | Ide et al. ................ 267/140.14 |
| 6,053,487 A | * | 4/2000 | Yotani et al. ........... 267/140.11 |
| 6,126,153 A | * | 10/2000 | Hein et al. .............. 267/140.13 |

FOREIGN PATENT DOCUMENTS

| JP | 5-149370 | 6/1993 |
| JP | 8-270718 | 10/1996 |
| JP | 9-280304 | 10/1997 |

* cited by examiner

Primary Examiner—Christopher P. Schwartz
Assistant Examiner—Benjamin A Pezzlo
(74) Attorney, Agent, or Firm—Burr & Brown (57) ABSTRACT

A fluid-filled vibration damping device including: (a) a first mounting member; (b) a second mounting member having axially opposite open ends, one of which is open toward the first mounting member; (c) an elastic body which connects the first and second mounting members and which fluid-tightly closes the one of the axially opposite open ends of the second mounting member; (d) a movable member which is displaceable in the axial direction and which fluid-tightly closes the other of the axially opposite open ends of the second mounting member; and (e) an actuator which displaces the movable member in the axial direction so as to control damping characteristics of the vibration damping device and which is disposed adjacent to the second mounting member. The actuator is provided with a generally tubular-shaped connector which connects the actuator with the second mounting member. The connector is fitted on an outer circumferential surface of the second mounting member so that the actuator is fixed relative to the second mounting member.

16 Claims, 8 Drawing Sheets

FLUID-FILLED VIBRATION DAMPING DEVICE HAVING ACTUATOR AND METHOD OF MANUFACTURING THE SAME

BACKGROUND OF THE INVENTION

1. Field of the Invention

The present invention relates in general to a fluid-filled vibration damping device which exhibits a damping effect based on flows of a non-compressible fluid contained therein. More particularly, the invention is concerned with such a fluid-filled vibration damping device having an actuator for suitably controlling or changing damping characteristics of the vibration damping device, and a method of manufacturing the same.

2. Discussion of the Related Art

As one type of a vibration damping device adapted to damp input vibrations based on flows of a fluid contained therein or based on pressure change of the fluid, there is known a fluid-filled vibration damping device capable of controlling or changing its damping characteristics depending upon the input vibrations or other factors, as disclosed in JP-A-08-270718, JP-A-09-280304 and JP-A-05-149370. Such a fluid-filled vibration damping device, in general, includes: (a) a first mounting member; (b) a second mounting member spaced apart from the first mounting member in an axial direction of the second mounting member, and having a generally tubular shape and axially opposite open ends one of which is open toward the first mounting member; (c) an elastic body which elastically connects the first and second mounting members, and which fluid-tightly closes the above-described one of the axially opposite open ends of the second mounting member; (d) a movable member which is displaceable in the axial direction, and which fluid-tightly closes the other of the axially opposite open ends of the second mounting member so as to cooperate with the second mounting member and the elastic body to define a fluid-tight space filled with a non-compressible fluid; and (e) an actuator which displaces the movable member in the axial direction so as to control damping characteristics of the vibration damping device, and which is disposed outwardly of the other of the axially opposite open ends of the second mounting member.

In the above-described conventional vibration damping device, the actuator is attached to the second mounting member by caulking means, or other fixing means such as suitable bolts, as described in the above-described publications, so that the actuator is firmly fixed to a main body of the vibration damping device in which the first and second mounting members are connected by the elastic body to each other and the fluid-tight space filled with the non-compressible fluid is defined by the second mounting member and the elastic body.

For producing the vibration damping device in which the actuator is attached to the main body as described, it is necessary to perform a cumbersome operation such as caulking or a bolt-tightening operation, which would not be necessary if the vibration damping device were not equipped with the actuator. Such a cumbersome operation deteriorates efficiency of the production. Further, the caulking operation requires an exclusive installation or equipment to be performed or used, thereby increasing the production cost.

SUMMARY OF THE INVENTION

It is therefore a first object of the present invention to provide a fluid-filled vibration damping device having a simple construction which permits an actuator to be efficiently attached to its main body by a simple operation such as a press-fitting or drawing operation.

It is a second object of the invention to provide a method of manufacturing the fluid-filled vibration damping device.

The present invention provides a fluid-filled vibration damping device or a method of manufacturing the same according to each of the following aspects, preferred forms or advantageous arrangements of the invention. It is to be understood that the following aspects, preferred forms and advantageous arrangements are provided to facilitate the understanding of possible combinations of features recited in the following aspects, preferred forms and advantageous arrangements, and that the technical features and the combinations of the technical features disclosed in the present specification are not limited to the following aspects, preferred forms and advantageous arrangements, but should be recognized based on the overall description of the specification and the drawings.

The above first object may be achieved according to a first aspect of the present invention, which provides a fluid-filled vibration damping device comprising: (a) a first mounting member; (b) a second mounting member which has a generally tubular shape and which is spaced apart from the first mounting member in an axial direction of the second mounting member, the second mounting member having axially opposite open ends, one of which is open toward the first mounting member; (c) an elastic body which elastically connects the first and second mounting members, and which fluid-tightly closes the one of the axially opposite open ends of the second mounting member; (d) a movable member which is displaceable in the axial direction, and which fluid-tightly closes the other of the axially opposite open ends of the second mounting member so as to cooperate with the second mounting member and the elastic body to define a fluid-tight space filled with a non-compressible fluid; and (d) an actuator which displaces the movable member in the axial direction so as to control damping characteristics of the vibration damping device, and which is disposed on one of axially opposite sides of the second mounting member which is remote from the first mounting member; wherein the improvement comprises: the actuator being provided with a connector which connects the actuator with the second mounting member, the connector having a generally tubular shape and extending from the actuator in a direction toward the above-described one of the axially opposite open ends of the second mounting member, the connector being fitted on an outer circumferential surface of the second mounting member so that the actuator is fixed relative to the second mounting member.

In the fluid-filled vibration damping device constructed according to this first aspect of the invention, it is possible to fix the movable member in an axial portion of the second mounting member which is adjacent to the above-described other of the axially opposite open ends of the second mounting member, by press-fitting the movable member into the axial portion of the second mounting member, or by drawing or plastically deforming the axial portion of the second mounting member radially inwardly thereby forcing the axial portion onto the movable member. Thus, a main body of the vibration damping device, in which the fluid-tight space is defined by the second mounting member, the elastic body and the movable member, can be obtained by the press-fitting or drawing operation without a cumbersome caulking operation. Similarly, it is also possible to fix the actuator to the thus obtained main body, by a press-fitting or drawing operation without a caulking operation.

Accordingly, the present vibration damping device advantageously eliminates a conventionally-required, cumbersome caulking operation in the production process and accordingly expensive equipment required for such caulking operation, whereby the production efficiency and cost of the present vibration damping device are remarkably improved and lowered, respectively.

The actuator defined in the present first aspect is not limited to any specific construction, but may be of, for example, a pneumatic actuator which has an enclosed air chamber partially defined by a wall member that is displaceable as a result of change of the pressure in the air chamber, so as to produce mechanical force based on the displacement of the wall member, or alternatively may be of an electromagnetic actuator which has an output member displaceable on the basis of an electromagnetic force or magnetic force. The damping characteristics of the vibration damping device may be controlled, for example, by alternately pressing and moving the movable member onto and away from an opening end of a fluid passage which is formed in the fluid-tight space so as to selectively open and close the fluid passage, or alternatively by oscillatingly displacing the movable member in the axial direction so as to control the pressure in the fluid-tight space.

According to a first preferred form of the first aspect of the invention, the actuator is fixed to the connector which is formed independently of the actuator. The independently formed connector may be fixed to the actuator by a simple pressing-fitting or drawing operation.

According to a second preferred form of the first aspect of the invention, the actuator includes a portion which is formed integrally with the connector.

According to a third preferred form of the first aspect of the invention, the movable member includes an elastic rubber sheet which is elastically deformable so as to be displaceable in the axial direction, and wherein the elastic rubber sheet is fixed at an outer periphery thereof to a fitting ring which is fitted in an inner circumferential surface of the second mounting member.

In the fluid-filled vibration damping device constructed according to the third preferred form of the first aspect of the invention, the movable member can be more easily attached in the above-described axial portion of the second mounting member, by a suitable press-fitting or drawing operation. The axial portion of the second mounting member is preferably covered at its inner circumferential surface with a seal layer which may be formed integrally with the elastic body or formed independently of the elastic body, so that the seal layer is radially interposed and gripped between and by the second mounting member and the fitting ring, whereby a degree of fluid-tightness of the fluid-tight space is advantageously increased.

According to a fourth preferred form of the first aspect of the invention, the second mounting member has, at the other of the axially opposite open ends, an annular engaging portion which extends radially inwardly from an inner circumferential surface of the second mounting member, and wherein the movable member is fixed at an outer circumferential surface thereof to a support member so as to be supported by the support member, displaceably relative to the second mounting member in the axial direction, the support member being disposed in an axial portion of the second mounting member which is located axially inwardly of the annular engaging portion, the support member being fitted in the axial portion by reduction of a diameter of the axial portion, so that the support member is fixed to the second mounting member.

Where the second mounting member is made of a metallic material, the annular engaging portion can be easily formed by plastically deforming or bending an axial end portion of the second mounting member inwardly in the radial direction. According to this fourth preferred form, the support member is more firmly fixed in the above-described axial portion of the second mounting member, owing to the annular engaging portion and the reduction of the diameter of the axial portion of the second mounting member.

According to a fifth preferred form of the first aspect of the invention, the fluid-filled vibration damping device further comprising a partition member fixedly disposed in the fluid-tight space so as to divide the fluid-tight space into a pressure-receiving chamber which is partially defined by the elastic body and which receives vibrations applied to the vibration damping device, and an equilibrium chamber which is partially defined by the movable member and whose volume is variable by displacement of the movable member, and wherein the partition member defines an orifice passage which communicates the pressure-receiving chamber and the equilibrium chamber and which has an open end open to the equilibrium chamber, and wherein the actuator displaces the movable member between an open position in which the movable member is spaced apart from the partition member to open the open end of the orifice passage, and a closed position in which the movable member is brought in contact with the partition member to close the open end, whereby the damping characteristics of the vibration damping device are controlled.

In the fluid-filled vibration damping device constructed according to this fifth preferred form, the damping characteristics of the vibration damping device can be controlled or changed by alternately opening and closing the orifice passage. The orifice passage may includes two orifice passages having respective ratios A/L which are different from each other, where "A" represents the cross sectional area of the passage while "L" represents the length of the passage. One of the two orifice passages, which has a larger ratio A/L than that of the other orifice passage, is selectively opened and closed, while the other orifice passage is held open, for selectively enabling or disabling the two orifice passages having the different ratios A/L, so that the vibration damping device exhibits a sufficiently high damping effect with respect to different frequency bands of the input vibrations.

According to a sixth preferred form of the first aspect of the invention, the actuator includes a rigid wall member, an elastic wall member which is opposed to the rigid wall member and is nearer to the first mounting member in the axial direction than the rigid wall member and which cooperates with the rigid wall member to define a working air chamber therebetween, a pressing member which is made of a hard material and which is fixed in a central portion of the elastic wall member, an annular fitting member which is fixed to an outer peripheral portion of the elastic wall member, and a biasing member which biases the pressing member in a direction away from the rigid wall member, wherein the working air chamber is connectable to a source of a vacuum pressure so that the pressing member is displaced in a direction toward the rigid wall member by suction of the vacuum pressure against a biasing force of the biasing member when the vacuum pressure is applied to the working air chamber, and wherein the annular fitting member is fitted in the connector so that the actuator is fixed to the connector.

According to a first advantageous arrangement of the sixth preferred form, the rigid wall member is formed integrally with the connector.

The actuator defined in the above sixth preferred form is preferably of a pneumatic actuator. The connector may be formed independently of the actuator, or alternatively may be formed integrally with a portion of the actuator. In the former case, the rigid wall member of the actuator may be fixed, for example, in an axially open end portion of the tubular-shaped connector. In the latter case, the rigid wall member of the actuator may be formed integrally with the connector, as described in the above first advantageous arrangement. That is, the tubular-shaped connector has, in its axially open end portion, a bottom wall which serves as the rigid wall member of the actuator. For fixing the actuator to the tubular-shaped connector, the annular fitting member of the actuator may be press-fitted in the connector, or may be fixed by caulking to the connector, or alternatively may be brought into engagement with a radial projection provided in the connector. The biasing member may include a coil spring disposed between the pressing member and the rigid wall member which are opposed in the axial direction.

According to a second advantageous arrangement of the sixth preferred form, the rigid wall member has, in a central portion thereof, a concave portion which is concave toward the elastic wall member, and an axial projection which projects from a bottom wall of the concave portion in a direction away from the elastic wall member and which has a through-hole for communication between the working air chamber and the exterior of the vibration damping device, the axial projection serving as a joint to which a conduit connected to the vacuum pressure source is connected, so that the vacuum pressure is applied to the working air chamber through the through-hole.

In the fluid-filled vibration damping device constructed according to this second advantageous arrangement of the sixth preferred form, the rigid wall member has the concave portion in the central portion, and the axial projection serving as the joint is provided in the bottom wall of the concave portion. According to this second arrangement, the joint does not have to protrude outwardly from the actuator or the vibration damping device, if the concave portion has a sufficiently large depth as measured in the axial direction. Further, the elastic wall member may have, in the central portion, a stop member which is made of an elastic material and which projects toward the bottom wall of the concave portion of the rigid wall member, so that the stop member is brought into abutting contact with the bottom wall of the concave portion so as to limit an amount of axial displacement of the pressing member toward the rigid wall member in a cushioning manner, when the pressing member is displaced in the direction toward the rigid wall member.

According to a seventh preferred form of the first aspect of the invention, the second mounting member has a flange portion which extends radially outwardly from the above-described one of the axially opposite open ends of the second mounting member, and wherein the connector is held in contact, at one of axially opposite open ends thereof remote from the actuator, with the flange portion of the second mounting member, so that the connector is held in a predetermined axial position relative to the second mounting member.

According to an eighth preferred form of the first aspect of the invention, the connector has a flange portion which extends radially outwardly from the above-described one of the axially opposite open ends of the connector, so that the connector is held in contact, at the flange portion of the connector, with the flange portion of the second mounting member.

In the fluid-filled vibration damping device constructed according to the above seventh preferred form, the connector is firmly held in the predetermined axial position relative to the second mounting member, owing to the simple mechanism, namely, by the abutting contact of the axial end of the connector with the flange portion of the second mounting member. The connector may have the flange portion in the axial end, as described in the above eighth preferred form, so that the connector is still more firmly held in the predetermined axial position relative to the second mounting member, by the abutting contact of the flange portions of the respective connector and second mounting member.

According to a ninth preferred form of the first aspect of the invention, the second mounting member has a fitting portion at which the second mounting member is fitted in the connector, and a small-diameter portion which has an outside diameter smaller than that of the fitting portion and which is axially nearer to the above-described other of the axially opposite open ends of the second mounting member, than the fitting portion.

In the fluid-filled vibration damping device constructed according to the ninth preferred form, the provision of the small-diameter portion in the second mounting member permits the second mounting member to be easily introduced into the tubular-shaped connector in an operation for assembling the actuator and the main body. The present ninth preferred form is advantageously carried out in combination with the above-described fourth preferred form in which the support member disposed in the axial portion of the second mounting member is fixed to the second mounting member by the reduction of the diameter of the axial portion. That is, the small-diameter portion is advantageously constituted by the axial portion whose diameter is reduced.

According to an advantageous arrangement of the ninth preferred form of the first aspect, the second mounting member further has a tapered portion which is located between the fitting portion and the small-diameter portion as viewed in the axial direction and which has an outside diameter that increases as the second mounting member extends in a direction away from the actuator toward the first mounting member.

If the second mounting member further has the tapered portion between the small-diameter and the fitting portion, as recited in this advantageous arrangement of the ninth preferred form, the second mounting member can be more easily introduced into the tubular-shaped connector, since the tapered portion facilitates entrance of the fitting portion into the connector, following entrance of the small-diameter portion into the connector.

The above second object may be achieved according to a second aspect of the present invention, which provides a method of manufacturing the fluid-filled vibration damping device defined in the above-described first aspect of the invention. The method comprises: (i) a step of preparing an integral intermediate assembly in which the first and second mounting members are bonded to the elastic body by vulcanization of an unvulcanized material to form said elastic body; (ii) a step of immersing the integral intermediate assembly and the movable member in a mass of the non-compressible fluid, and fitting the movable member into the second mounting member within the mass of the non-compressible fluid, so that the fluid-tight space is filled with the non-compressible fluid; (iii) a step of reducing a diameter of the second mounting member, such that the movable member is fixed to the second mounting member, and such that the other of the axially opposite open ends of the second mounting member is fluid-tightly closed; (iv) a step of preparing the actuator which is provided with the connector; and (v) a step of fitting the connector onto the outer circumferential surface of the second mounting member in an atmosphere, so that the actuator is fixed relative to the second mounting member.

According to the present method, the movable member can be attached to the integral intermediate assembly by the press-fitting or drawing operation, so that the main body of the vibration damping device can be obtained without a cumbersome caulking operation. Similarly, the actuator can be attached to the main body by the press-fitting or drawing operation without a caulking operation. Accordingly, the present method eliminates a conventionally-required, cumbersome caulking operation in the production process and accordingly expensive equipment required for such caulking operation, whereby the efficiency of the production and cost of the equipment for the production are remarkably improved and lowered, respectively.

According to a preferred form of the second aspect of the invention, the method comprises a step of fitting the connector onto the outer circumferential surface of the second mounting member, by successively introducing the small-diameter portion, the tapered portion and the fitting portion of the second mounting member in the order of description into the connector through one of axially opposite open ends of the connector which is remote from the actuator, so that the actuator is fixed relative to the second mounting member.

BRIEF DESCRIPTION OF THE DRAWINGS

The above objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
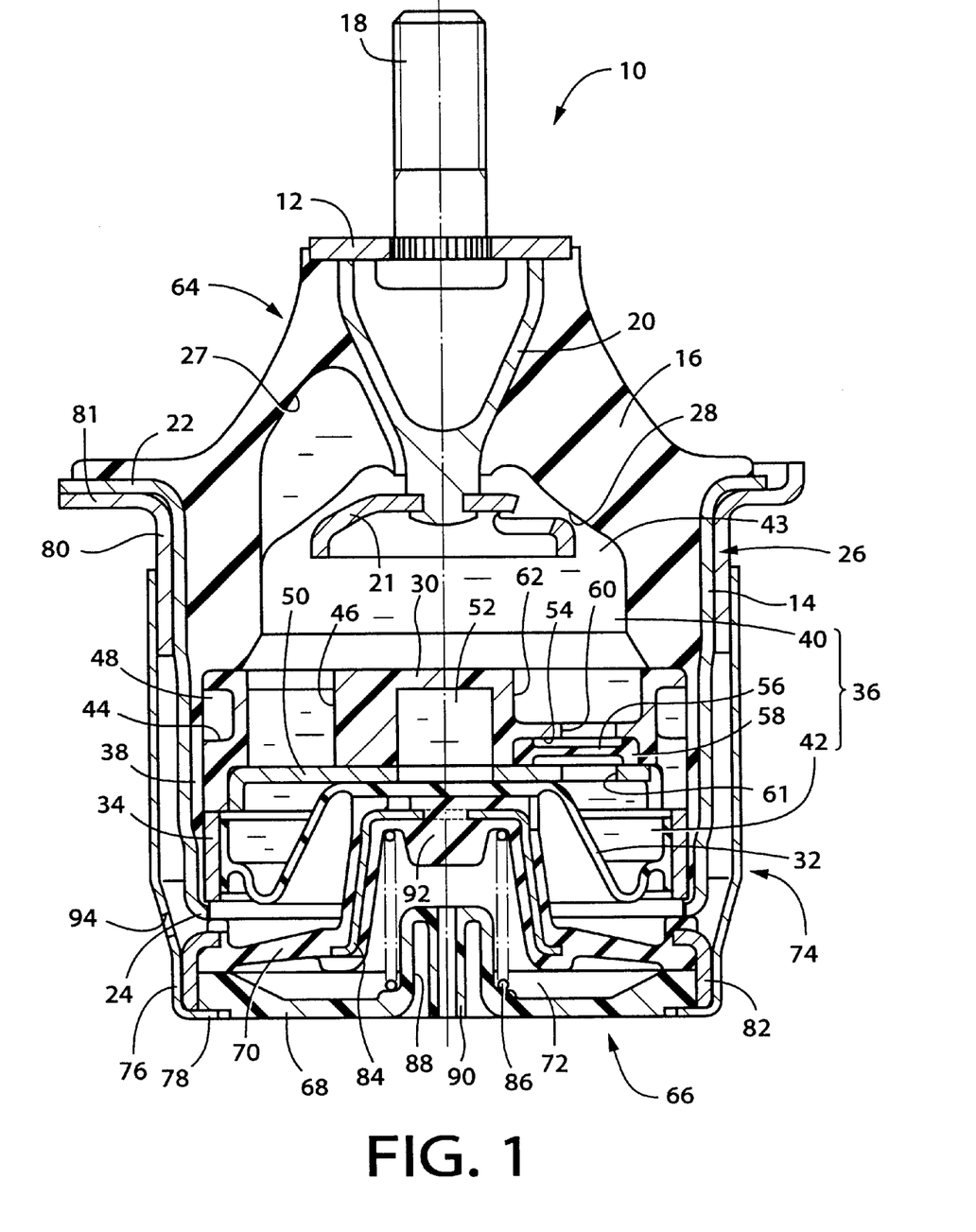
FIG. 1 is an elevational view in transverse cross section of an engine mount according to a first embodiment of this invention.

Referring first to FIG. 1, there is shown a fluid-filled vibration damping device in the form of an engine mount 10 constructed according to a first embodiment of this invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material, and are attached to one and the other of the power unit and the body of a motor vehicle, so that the power unit which includes an engine is mounted on the vehicle body in a vibration damping fashion. With this engine mount 10 installed on the vehicle as described above, the elastic body 16 is held elastically compressed with the weight of the power unit acting on the engine mount 10, whereby the first and second mounting members 10, 12 are displaced toward each other by a suitable amount. The engine mount 10 receives a vibrational load primarily in a direction in which the first and second mounting members 10, 12 are opposed to each other, i.e., in the substantially vertical direction as seen in FIG. 1.

The first mounting member 12 has a disc-like shape. A mounting bolt 18 is secured to the first mounting member 12 so as to project from its central portion in the axially upward direction of the engine mount 10. A hollow support body 20, formed of a metallic material and having a generally inverted-frustoconical shape, is fixed to the first mounting member 12 so as to project from the central portion in the axially downward direction of the engine mount 10. A working member in the form of umbrella-shaped member 21 made of a metallic material is fixed by caulking to an axially lower end portion of the support body 20. The first mounting member 12 is attached, through the mounting bolt 18, to the power unit of the vehicle.

The second mounting member 14 has a generally tubular shape and a large diameter. The second mounting member 14 includes a flange portion 22 which extends radially outwardly over a predetermined radial distance from an upper one of axially opposite open ends of the second mounting member 14, and also an annular engaging portion 24 which extends radially inwardly over a short radial distance from the lower open end of the second mounting member 14 and which extends circumferentially over the entire circumference of the second mounting member 14.

The second mounting member 14 is advantageously formed, for example, by first obtaining a cup-shaped intermediate product in a drawing or other pressing operation, and then blanking or punching a central portion of a bottom wall of the cup-shaped intermediate product. The annular engaging portion 24 is given by a radially outer end portion of the bottom wall which is not removed in the blanking or punching operation.

The first and second mounting members 12, 14 are connected to each other by the elastic body 16 which is interposed therebetween, such that the first mounting member 12 is positioned on an upper one of axially opposite sides of the second mounting member 14, and has substantially coaxial and spaced-apart relationship with the second mounting member 14. The elastic body 16 has a generally frustoconical shape, and is bonded to the first and second mounting members 12, 14. More specifically, the elastic body 16 is bonded in a vulcanization process thereof, at an end face of its small-diameter, axially upper end portion, to a lower end face of the first mounting member 12, and at an outer circumferential surface of its large-diameter, axially lower end portion to an inner circumferential surface of an axially upper end portion of the second mounting member 14. With this vulcanization process, there is obtained an integral intermediate assembly 26 consisting of the first and second mounting members 12, 14 and the elastic body 16 which is bonded to the members 12, 14 such that the axially upper open end of the second mounting member 14 is fluid-tightly closed by the elastic body 16. The elastic body 16 has a conical recess 28 formed in an end face of its large-diameter, axially lower end portion. The axially lower end portion of the support body 20, which is secured to the first mounting member 12, projects downwardly from the elastic body 16 into the conical recess 28. Thus, the umbrella-shaped member 21 supported by the support body 20 is located in the conical recess 28.

The elastic body 16 further has a plurality of pocket-like voids 27 formed in the inner conical surface of the conical recess 28. The pocket-like voids 27 are located around the center of the elastic body 16 and angularly spaced part from each other by a predetermined angular interval in the circumferential direction. Each of the pocket-like voids 27 has a predetermined depth and opens downwardly in the conical recess 28. The thickness of the elastic body 16 is reduced to be smaller in its portions in which the pocket-like voids 27 are formed, than the remaining portions in which the voids 27 are not formed. That is, the thickness of the elastic body 16 in the portions in which the voids 27 are formed corresponds to the thickness of the bottom walls of the voids 27.

In the second mounting member 14, there are accommodated a partition member 30 and a diaphragm 32. The partition member 30 and the diaphragm 32 are positioned in the axially intermediate portion and the axially lower open end portion of the second mounting member 14, respectively. The partition member 30 is provided by a rigid member which is formed of a synthetic resin or a metallic material, and has a generally thick-walled, disc-like shape. The diaphragm 32 is provided by a thin-walled rubber sheet which is easily elastically deformable, and is bonded at its outer peripheral portion to a metal fitting ring 34 in a vulcanization process. The partition member 30 and the diaphragm 32 are introduced in the order of description through the axially lower open end of the second mounting member 14, so as to be positioned in predetermined axial positions relative to the second mounting member 14. The second mounting member 14 is then subjected to a drawing operation in which the diameter of the second mounting member 14 is reduced, so that the partition member 30 and the fitting ring 34 are fixedly fitted in the second mounting member 14. It is noted that, in the present embodiment, the diaphragm 32 serves as a movable member, and the fitting ring 34 serves as a support member for supporting the movable member.

The fitting ring 34, which is bonded to the outer peripheral portion of the diaphragm 32, is fixed to the axially lower open end portion of the second mounting member 14, whereby the axially lower open end of the second mounting member 14 is fluid-tightly closed by the diaphragm 32, so as to define, in the second mounting member 14, a fluid-tight space 36 which is filled with a non-compressible fluid. The non-compressible fluid may be selected from among water, alkylene glycol, polyalkylene glycol, silicone oil, or a mixture of two or more of them. In the present embodiment, however, a fluid having a low viscosity of not more than 0.1 Pa·s is preferably used as the non-compressible fluid in order to obtain an excellent vibration-damping effect based on resonance of the fluid. Further, in the present embodiment, the second mounting member 14 is covered at a substantially entire inner circumferential surface thereof by a thin-walled seal layer 38 which is formed integrally with the elastic body 16, so that the fluid-tight space 36 is divided by the partition member 30 into two sections with a high degree of fluid tightness therebetween, and the axially lower open end of the second mounting member 14 is closed by the diaphragm 32 with a high degree of fluid tightness.

Figure 3:
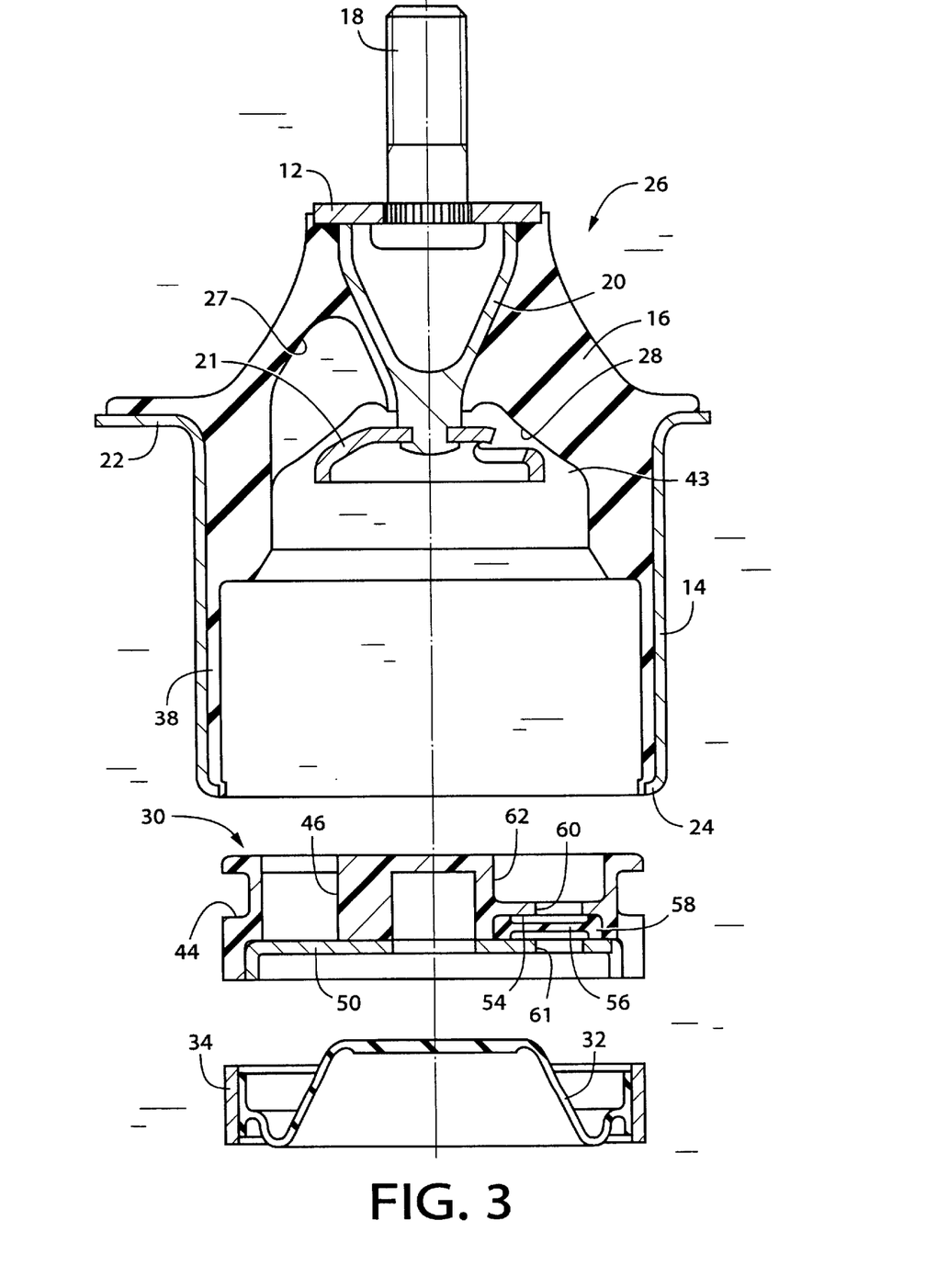
FIG. 3 is a view for explaining a process of assembling a main body of the engine mount of FIG. 1.

The fluid-tight space 36 can be easily filled with the non-compressible fluid, for example, by assembling the partition member 30 and the diaphragm 32 with the integral intermediate assembly 26, within a container filled with the fluid, as illustrated in FIG. 3. Described more specifically, the integral intermediate assembly 26, the partition member 30 and the diaphragm 32, which have been prepared independently of each other, are first immersed in a mass of the fluid within the container, and the partition member 30 and the diaphragm 32 (the fitting ring 34) are then introduced into the second mounting member 14 of the integral intermediate assembly 26 within the mass of the fluid. The partition member 30 and the diaphragm 32 are fixed to the second mounting member 14, by reducing the diameter of the second mounting member 14 in a drawing operation with a suitable number of dies, e.g., eight dies disposed around the outer circumferential surface of the second mounting member 14, for radially inward compression of the second mounting member 14, so that a main body 64 of the engine mount 10 having the fluid-tight space 36 therein is obtained. It is noted that the fitting ring 34 is positioned axially inwardly of the annular engaging portion 24 which is located at the axially lower open end of the second mounting member 14. Further, with the radially inward compression of the second mounting member 14 in the drawing operation, an inside diameter of a radially inner end of the annular engaging portion 24 is reduced to be smaller than an outside diameter of the fitting ring 34, so that the fitting ring 34 is prevented by the annular engaging portion 24 from being removed from the second mounting member 14 in the axial direction.

The fluid-tight space 36 is divided into upper and lower sections by the partition member 30 which is positioned in the axially intermediate portion of the second mounting member 14. The upper section partially defined by the elastic body 16 serves as a pressure-receiving chamber 40, while the lower section partially defined by the diaphragm 32 serves as an equilibrium chamber 42. Upon application of the vibrational load between the first and second mounting members 12, 14, the pressure of the fluid in the pressure-receiving chamber 40 varies due to elastic deformation of the elastic body 16, while the volume of the equilibrium chamber 42 is permitted to vary by displacement or deformation of the diaphragm 32. It is noted that the diaphragm 32 has a generally corrugated shape in its axial cross section. The corrugated shape facilitates the deformation of the diaphragm 32.

With the engine mount 10 installed on the vehicle body, the umbrella-shaped member 21 is positioned in an axially intermediate portion of the pressure-receiving chamber 40, so that the pressure-receiving chamber 40 is substantially divided by the umbrella-shaped member 21 into two sections communicating with each other through an annular restricted fluid passage 43 which is an annular gap formed between the outer circumferential surface of the umbrella-shaped member 21 and the corresponding portion of the inner circumferential surface of the pressure-receiving chamber 40. Upon application of the vibrational load to the present engine mount 10, the first and second mounting members 12, 14 are oscillatingly displaced relative to each other in the axial direction, whereby the umbrella-shaped member 21 is oscillatingly displaced within the pressure-receiving chamber 40 in the axial direction, so that the non-compressible fluid is forced to flow between the upper and lower sections of the pressure-receiving chamber 40 through the annular restricted fluid passage 43.

Figure 2:
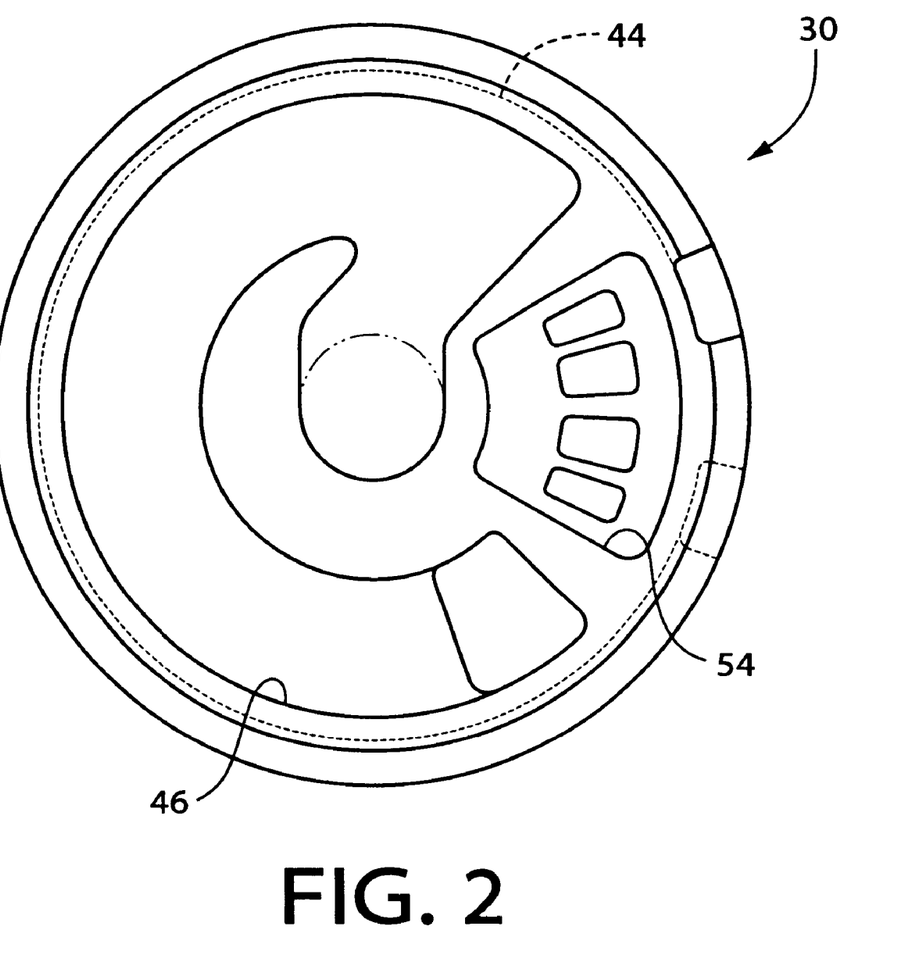
FIG. 2 is a bottom view of a partition member of the engine mount of FIG. 1.

As shown in FIG. 2, the partition member 30 has a first groove 44 which is formed in an outer circumferential surface of the member 30 and opens in the outer circumferential surface, and a second groove 46 which is formed in an axially lower end surface of the member 30 and opens in the axially lower end surface. The first groove 44 extends in a circumferential direction of the member 30 over a predetermined length slightly smaller than a circumferential length of the member 30. The second groove 46 is positioned radially inwardly of the first groove 44, and extends generally in the circumferential direction over a predetermined angle, e.g. about 270°, around the axis of the member 30. The first groove 44 is closed at its opening by the inner circumferential surface of the second mounting member 14, so as to provide a first orifice passage 48 which communicates at its opposite open ends with the pressure-receiving and equilibrium chambers 40, 42, for permitting fluid communication therethrough between the two chambers 40, 42. The second groove 46 is covered at its opening by a generally disc-shaped covering member 50 which is fixedly superposed on the axially lower end surface of the partition member 30, so as to provide a second orifice passage 52 which communicates at its opposite open ends with the pressure-receiving and equilibrium chambers 40, 42, for permitting fluid communication therethrough between the two chambers 40, 42. One of the opposite open ends of the second orifice passage 52, at which the second orifice passage 52 communicates with the equilibrium chamber 42, is located in a central portion of the partition member 30, and is defined by a flat surface of the covering member 50.

The partition member 30 further has an accommodating recess 54 formed in a portion of the axially lower end surface in which portion the second groove 46 is not formed, as shown in FIG. 2. The accommodating recess 54, which opens in the axially lower end surface, has a predetermined depth (as measured in the axial direction of the member 30) and extends in the circumferential direction over a predetermined angle around the axis of the member 30, so as to have a generally arcuate or fan-like shape. In the accommodating recess 54, there is accommodated an elastic plate 56 which is made of a rubber material. The accommodating recess 54 is covered at its opening by the covering member 50. The elastic plate 56 has a main body portion whose thickness is smaller than the depth of the accommodating recess 54, and a thick-walled, peripheral portion 58 which is located at the periphery of the elastic plate 56. The peripheral portion 58 has a thickness larger than that of the main body portion, and protrudes from opposite sides of the main body portion in the thickness direction, i.e. in the vertical direction as viewed in FIG. 1. The elastic plate 56 is interposed and gripped at the peripheral portion 58 between and by the bottom surface of the accommodating recess 54 and the covering member 50, and accordingly is positioned in an intermediate portion of the recess 54 as viewed in the depth direction of the recess 54 so as to divide an internal space of the recess 54 into two sections which are arranged in the depth direction. The two sections of the internal space of the recess 54 communicate with the respective pressure-receiving and equilibrium chambers 40, 42 through apertures 60, 61 which are formed through the bottom wall of the recess 54 and the covering member 50, respectively. Thus, internal pressures of the respective pressure-receiving and equilibrium chambers 40, 42 act on upper and lower side surfaces of the elastic plate 56, respectively, so that the elastic plate 56 is elastically deformable or displaced based on the difference between the internal pressures of the respective two chambers 40, 42. The displacement of the elastic plate 56 permits volumes of the respective two chambers 40, 42 to be changed by an amount corresponding to the amount of the displacement of the elastic plate 56.

In the present embodiment, the cross sectional area and the length of the first orifice passage 48 are determined so that the engine mount 10 exhibits a high damping effect with respect to low-frequency vibrations such as engine shakes, on the basis of the resonance of the fluid flowing through the first orifice passage 48. The second orifice passage 52 has a larger ratio A/L than that of the first orifice passage 48, wherein "A" and "L" represent the cross sectional area and the length of each orifice passage 48, 52, respectively. That is, the second orifice passage 52 is tuned to provide the engine mount 10 with a high damping or isolating effect with respect to medium-frequency vibrations such as engine idling vibrations, upon application of the medium-frequency vibrations to the engine mount 10 where the first orifice passage 48 is substantially closed. Further, the accommodating recess 54 is tuned to provide the engine mount 10 with a high damping or isolating effect with respect to high-frequency vibrations such as booming noises. Namely, upon application of the high-frequency vibrations to the engine mount 10 where both of the first and second orifice passages 48, 52 are substantially closed, the elastic plate 56 is elastically deformed or displaced based on the difference between the internal pressures of the respective pressure-receiving and equilibrium chambers 40, 42, thereby permitting volumetric changes of the two chambers 40, 42. The increase of the volume of the pressure-receiving chamber 40, owing to the displacement of the elastic plate 56 in a direction toward the equilibrium chamber 42 away from the pressure-receiving chamber 40, is functionally equivalent to flows of the fluid from the pressure-receiving chamber 40 to the equilibrium chamber 42, and accordingly reduces or absorbs a rise of the fluid pressure in the pressure-receiving chambers 40, whereby an excessive increase in the dynamic spring constant of the engine mount 10 is prevented.

The partition member 30 further has a recess 62 formed in the axially upper end surface of the member 30. The recess 62 has a generally arcuate or fan-like shape substantially identical to that of the accommodating recess 54, and is located in the substantially same position as the accommodating recess 54 as viewed in the radial direction and also in the circumferential direction, whereby the thickness of the bottom wall through which the apertures 60 are formed is reduced. The reduction of the thickness of the bottom wall facilitates flows of the fluid through the apertures 60 so that the fluid is constantly allowed to flow through the apertures 60 even upon application of the high-frequency vibrations to the engine mount 10.

The cross sectional area and the length of the annular restricted fluid passage 43 are determined so that the engine mount 10 exhibits a high damping or isolating effect with respect to vibrations of higher frequencies on the basis of the resonance of the fluid flowing through the annular restricted fluid passage 43, upon application of the still higher-frequency vibrations to the engine mount 10 where even the resistance to the flows of the fluid through the apertures 60 is considerably increased. The provision of the pocket-like voids 27 in the elastic body 16 facilitates the elastic deformation of the elastic body 16 as a result of changes of the internal pressure in the pressure-receiving chamber 40, thereby assuring a sufficiently large amount of the fluid flow within the pressure-receiving chamber 40 or through the restricted fluid passage 43, so that the engine mount 10 exhibits an excellent damping effect with respect to the still higher-frequency vibrations.

In addition to the main body 64 constructed as described above, the engine mount 10 further includes a pneumatic actuator 66 which is attached to the main body 64 to be positioned below the second mounting member 14. This pneumatic actuator 66 has a rigid wall member 68 which is made of a synthetic resin, metal or other rigid material and has a generally disc-like shape; an elastic wall member 70 which is made of a rubber material and has a generally disc-like shape and which is opposed to the rigid wall member 68 and is nearer to the second mounting member 14 in the axial direction than the rigid wall member 68; and an annular fitting member 82 which is made of a metallic material and which is bonded to an outer circumferential surface of the elastic wall member 70 in a vulcanization process. The rigid wall member 68 and the elastic wall member 70 are superposed on each other in the axial direction, and cooperate with each other to define therebetween a working air chamber 72. The pneumatic actuator 66 is connected to the main body 64 through a thin-walled, tubular member 74 which is made of a metallic material and has a large diameter.

The tubular member 74 has, in its axially lower end portion, a small-diameter portion 76 in which the diameter of the tubular member 74 is reduced by, for example, a drawing operation so as to be smaller than that of the other axial portion of the tubular member 74. The tubular member 74 further has an integrally-formed, annular radial projection 78 which extends radially inwardly over a predetermined radial distance from the axially lower open end of the tubular member 74 and which extends circumferentially over the entire circumference of the tubular member 74. The tubular member 74 is advantageously formed, for example, by first obtaining a cup-shaped intermediate product in a drawing or other pressing operation, and then blanking or punching a central portion of a bottom wall of the cup-shaped intermediate product. The annular radial projection 78 is given by a radially outer end portion of the bottom wall which is not removed in the blanking or punching operation.

Figure 4:
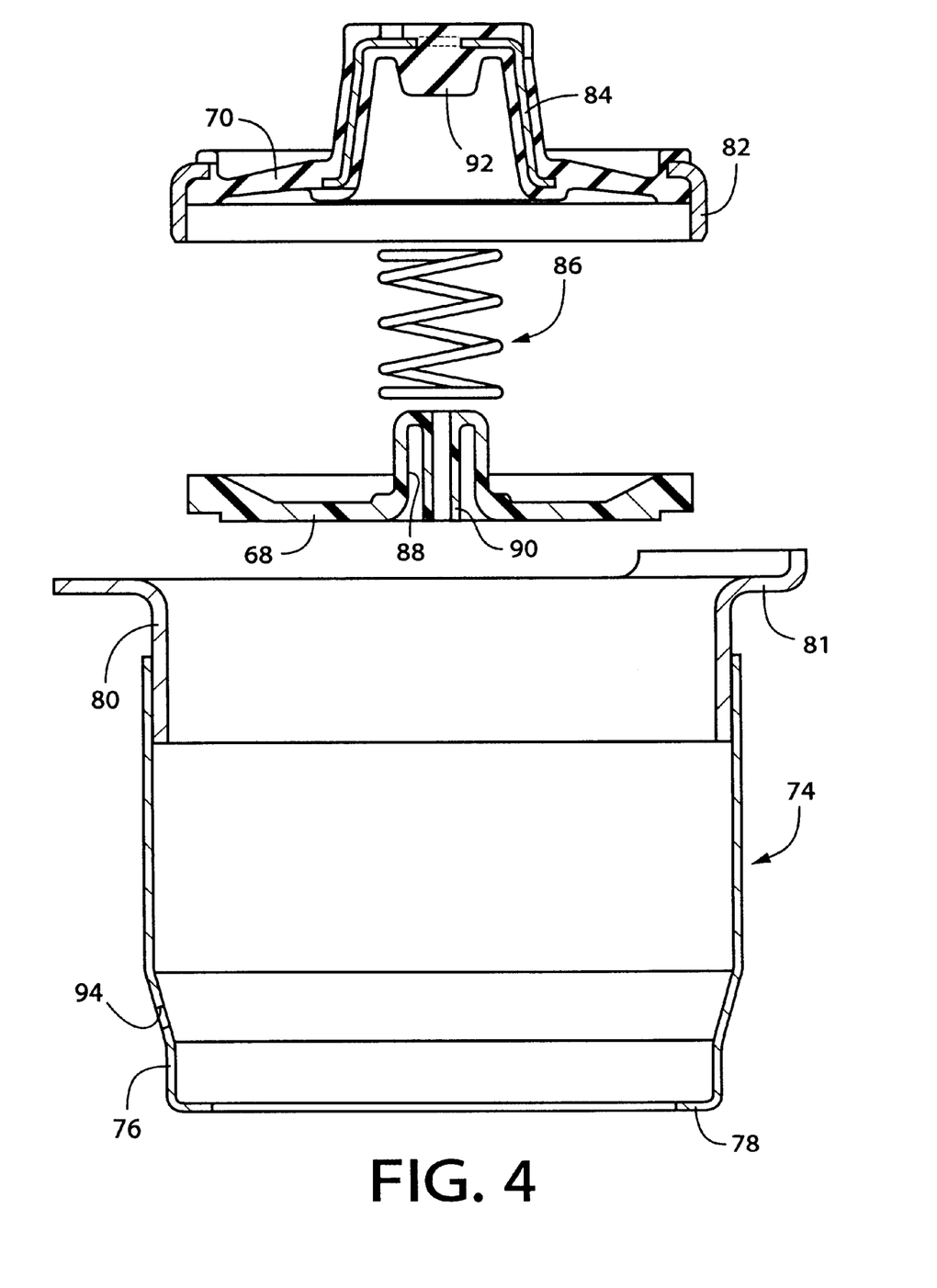
FIG. 4 is a view for explaining a process of assembling an actuator of the engine mount of FIG. 1.

To the axially upper end portion of the tubular member 74, there is attached a bracket member 80 which is made of a metallic material and has a generally thick-walled annular shape. The bracket member 80 includes a flange portion 81 which extends radially outwardly over a predetermined radial distance from an upper one of axially opposite open ends of the bracket member 80. The bracket member 80 is press-fitted in, welded to, or otherwise fixed to the axially upper open end portion of the tubular member 74. The rigid wall member 68 and the elastic wall member 70, which are prepared independently of each other, are introduced in the order of description through the axially upper open end of the tubular member 74 into the tubular member 74, such that the rigid wall member 68 is brought into engagement at its outer peripheral portion with the annular radial projection 78 of the tubular member 74, and such that the annular fitting member 82 is press-fitted in the small diameter portion 76 of the tubular member 74. The outer peripheral portions of the respective rigid wall member 68 and elastic wall member 70 are fluid-tightly gripped by and between the annular radial projection 78 and the annular fitting member 82, whereby the working air chamber 72 is defined between the rigid wall member 68 and the elastic wall member 70. In the present embodiment, the tubular member 74 and the bracket member 80 cooperate with each other to constitute a connector for connecting the actuator 66 and the second mounting member 14.

The elastic wall member 70 has a generally inverted-cup-shaped pressing member 84, which is made of a metallic material, and which is fixedly embedded in the central portion of the elastic wall member 70 in a vulcanization process. In a central portion of the working air chamber 72, there is accommodated a coil spring 86 which serves as a biasing member. The coil spring 86 is interposed between the surfaces of the respective rigid wall member 68 and elastic wall member 70 which are opposed to each other, so that the pressing member 84 fixed in the elastic wall member 70 is constantly biased by a biasing force of the coil spring 86 in the upward direction, i.e., in a direction away from the rigid wall member 68.

The rigid wall member 68 has in its central portion a generally inverted-cup-shaped concave portion 88 which is concave in the upward direction, i.e., in a direction toward the bottom wall of the pressing member 84 embedded in the elastic wall member 70. An axial projection 90 is provided at a substantially central portion of the bottom wall of the concave portion 88, and projects over a predetermined axial length downwardly from the bottom wall of the concave portion 88. The axial projection 90 has a through-hole formed therethrough for communicating the working air chamber 72 and the exterior of the engine mount 10. The axial projection 90 serves as a joint to which an air conduit (not shown) is joined, so that the working air chamber 72 is connected, through the air conduit, selectively to a suitable vacuum pressure source (not shown) and an atmosphere. When the atmospheric pressure is applied to the working air chamber 72 through the air conduit, the pressing member 84 is kept away from the rigid wall member 68 based on the biasing force of the coil spring 86. When the vacuum pressure is applied to the working air chamber 72, the pressing member 84 is retracted downwardly, i.e., toward the rigid wall member 68, by suction of the vacuum pressure against the biasing force of the coil spring 86. It is noted that the concave portion 88 of the rigid wall member 68 has a depth as measured in the axial direction, which is larger than the axial length of the joint 90, so that the axially distal end of the joint 90 is not positioned axially outwardly of the rigid wall member 68. Thus, the joint 90 does not protrude outwardly from the actuator 66 or the vibration damping device 10. This permits, for example, the actuator 66 to be placed on a working table, with a bottom surface of the rigid wall member 68 brought in stable contact with a surface of the working table, thereby facilitating assembling of the vibration damping device 10 and also handling of the assembled vibration damping device 10.

On the bottom wall of the inverted-cup-shaped pressing member 84 which is opposed to the bottom wall of the concave portion 88 of the rigid wall member 68, there is provided a generally cylindrical stop member 92 which is made of a rubber material. The stop member 92 projects from the bottom wall of the pressing member 84 downwardly, i.e., toward the concave portion 88. When the pressing member 84 is retracted downwardly upon application of the vacuum pressure to the working air chamber 72, the stop member 92 is brought into abutting contact with the bottom wall of the concave portion 88 of the rigid wall member 68, to thereby limit an amount of axial displacement of the pressing member 84 toward the rigid wall member 68 in a cushioning manner.

For attaching the pneumatic actuator 66 to the main body 64, the main body 64 is introduced through the axially upper open end of the tubular member 74 into the tubular member 74, and the bracket member 80 bonded to the tubular member 74 is fitted onto the second mounting member 14 of the main body 64, so that the actuator 66 is disposed adjacent to the axially lower open end of the second mounting member 14, as shown in FIG. 1. The flange portion 81 of the bracket member 80 is held in contact with the flange portion 22 of the second mounting member 14 whereby the actuator 66 is held in a predetermined position relative to the main body 64 in the axial direction. The bracket member 80 has a plurality of mounting bolts secured to the flange portion 81, or a plurality of bolt holes formed through the flange portion 81, so that the second mounting member 14 is attached to the vehicle body (not shown) through the bracket member 80. It is noted that the operation for assembling the pneumatic actuator 66 and the operation for attaching the actuator 66 to the main body 64 are advantageously carried out in the atmosphere.

With the actuator 66 attached to the main body 64, the inverted-cup-shaped pressing member 84 is located on one of axially opposite sides of the diaphragm 32 which is remote from the partition member 30, and the bottom wall of the pressing member 84 is positioned to be opposed to the open end of the second orifice passage 52 in which the second orifice passage 52 opens to the equilibrium chamber 42 and which is located in the central portion of the partition member 30. When the atmospheric pressure is applied to the working air chamber 72 of the actuator 66, the central portion of the diaphragm 32 is forced onto the partition member 30 by the pressing member 84 which is biased by the biasing force of the coil spring 86. Thus, the open end of the second orifice passage 52 is closed by the diaphragm 32, whereby the fluid flow through the second orifice passage 52 is inhibited. When the vacuum pressure is applied to the working air chamber 72, on the other hand, the pressing member 84 is retracted downwardly by suction of the vacuum pressure against the biasing force of the coil spring 86, so that the pressing member 84 and the diaphragm 32 are moved away from the partition member 30. Thus, the open end of the second orifice passage 52 is opened to the equilibrium chamber 42, to thereby permit the fluid flow through the second orifice passage 52.

When the atmospheric pressure is applied to the working air chamber 72 of the actuator 66, a sufficient amount of the fluid flows through the first orifice passage 48 between the pressure-receiving and equilibrium chambers 40, 42, so that the engine mount 10 exhibits a high damping effect with respect to low-frequency, large-amplitude vibrations such as engine shakes, on the basis of the resonance of the fluid flowing through the first orifice passages 48. Upon application of high-frequency, small-amplitude vibrations to the engine mount 10, the amount of change of the fluid pressure in the pressure-receiving chamber 40 is advantageously reduced or absorbed by the volumetric changes of the pressure-receiving and equilibrium chambers 40, 42 as a result of the elastic deformation of the elastic plate 56, so that the engine mount 10 exhibits a sufficiently low dynamic spring constant thereby effectively damping or isolating the high-frequency vibrations. It is noted that the engine mount 10 exhibits a high damping effect also with respect to vibrations whose frequency range is still higher than that of the high-frequency vibrations, on the basis of flow of the fluid through the annular restricted fluid passage 43.

When the vacuum pressure is applied to the working air chamber 72 of the actuator 66, on the other hand, a sufficient amount of the fluid flows between the pressure-receiving and equilibrium chambers 40, 42 through the second orifice passage 52 which has a fluid flow resistance sufficiently smaller than the first orifice passage 48, so that the engine mount 10 exhibits a high damping effect with respect to medium-frequency, medium-amplitude vibrations such as engine idling vibrations, on the basis of the resonance of the fluid flowing through the second orifice passages 52.

The working air chamber 72 of the pneumatic actuator 66 is connected selectively to the vacuum pressure and the atmosphere depending upon a running condition of the vehicle or other factors, namely, depending upon the frequency bands of the vibrations applied to the engine mount 10, making it possible to suitably control or change the damping characteristics of the engine mount 10. Thus, the engine mount 10 is capable of exhibiting an excellent vibration damping effect over a wide range of frequency of the input vibrations. It is noted that the tubular member 74, which holds the actuator 66 in the predetermined position relative to the second mounting member 14 or the main body 64, has a communication hole 94 formed through a cylindrical wall thereof. The communication hole 94 permits an internal space defined by the diaphragm 32 and the elastic wall member 70, to be held in communication with the exterior of the engine mount 10 therethrough, so that the diaphragm 32 is allowed to be easily deformed or displaced in the axial direction.

For assembling the main body 64 of the engine mount 10, according to the present embodiment, the partition member 30 and the diaphragm 32 are fixed to the integral intermediate assembly 26 by a simple operation such as a press-fitting or drawing operation. For attaching the pneumatic actuator 66 to the main body 64, too, the actuator 66 is fixed to the main body 64 by a pressing-fitting or drawing operation. Further, the assembling of the tubular member 74 and the rigid and elastic wall members 68, 70 into the actuator 66 is also effected by a pressing-fitting or drawing operation.

Accordingly, the engine mount 10 of the present invention can be manufactured without a cumbersome caulking operation, and accordingly without an installation or equipment required exclusively for a caulking operation. The manufacture without a caulking operation leads to an increase of the efficiency for the manufacture and a reduction of the manufacturing cost. Further, the engine mount can be made more compact in size than a conventional engine mount which includes members or components assembled together by a caulking operation. That is, the diameter of the engine mount is made smaller than that of the conventional engine mount, by an amount corresponding to a radial dimension of a radially-outwardly-projecting caulking part of the members or components of the conventional engine mount.

The process for manufacturing the main body 64 of the engine mount 10 is substantially the same as that for manufacturing a conventional fluid-filled vibration damping device which has a single orifice passage and does not have an actuator or means for selectively changing the damping characteristics. Accordingly, the engine mount 10 can be manufactured by using a conventional manufacturing line or installation which has been used for manufacturing the conventional fluid-filled vibration damping device, without a substantial modification to the manufacturing line or installation.

In the present engine mount 10, the engaging portion 24 of the second mounting member 14 serves to prevent the fitting ring 34 from being removed from the second mounting member 14 in the axial direction, and the annular radial projection 78 of the tubular member 74 cooperates with the annular fitting member 82 to fix the rigid wall member 68 and elastic wall member 70 to the tubular member 74. The engaging portion 24 and the annular radial projection 78, which thus contribute to an increased operating reliability and a prolonged durability of the engine mount 10, are advantageously given by the portions of the respective cup-shaped intermediate products, which portions are not removed in the blanking operations, as described above.

Figure 5:
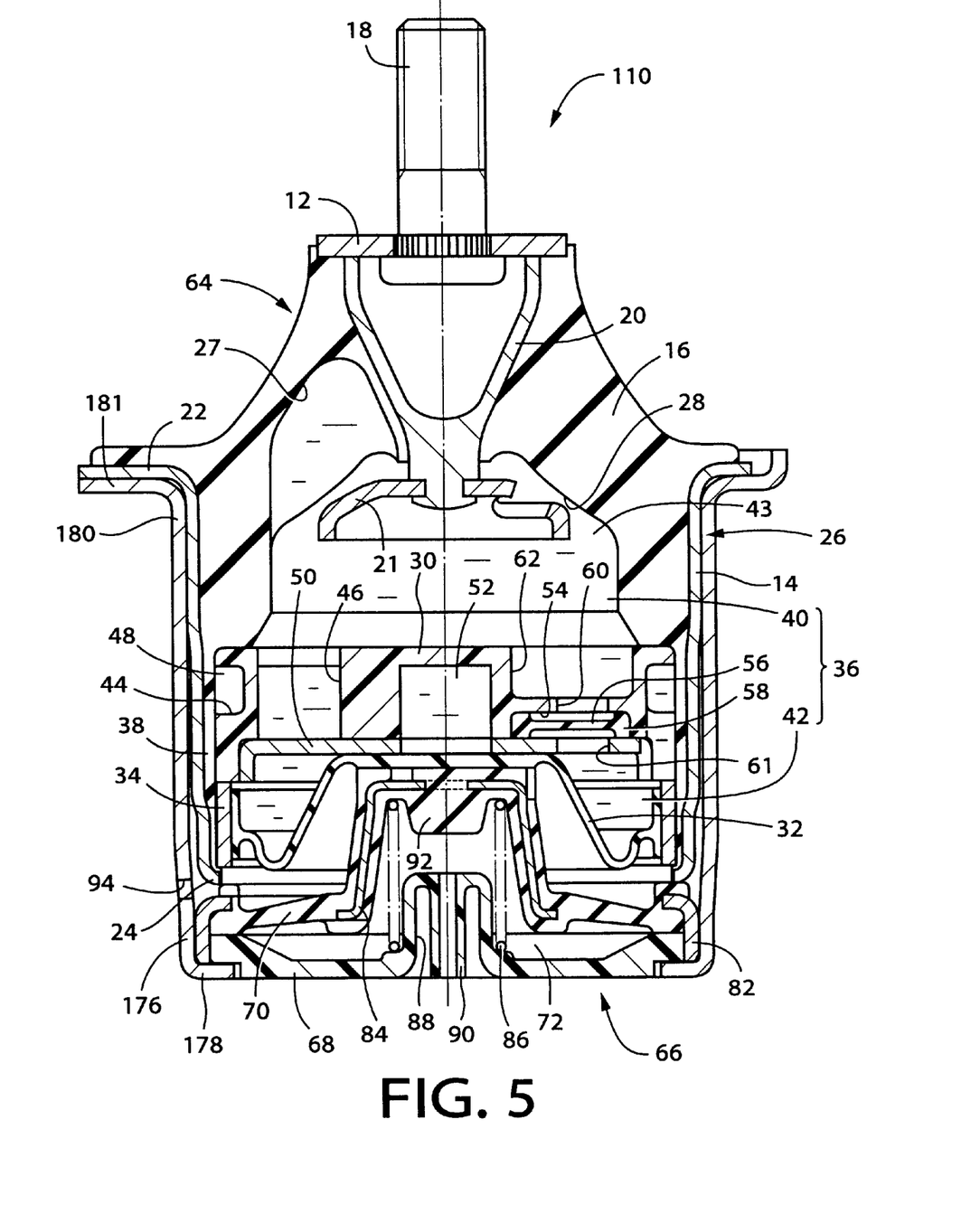
FIG. 5 an elevational view in transverse cross section of an engine mount according to a second embodiment of this invention.

There will be described an engine mount 110 according to a second embodiment of the present invention, by reference to FIG. 5, wherein the same reference numerals as used in FIG. 1 are used to identify the corresponding components or elements.

The engine mount 110 of the second embodiment is different from the engine mount 10 of the first embodiment, in the construction of the connector which serves to connect the actuator 66 with the main body 64. That is, in the engine mount 110, the connector is constituted by a generally tubular-shaped bracket member 180 in place of the tubular member 74 and the bracket member 80. Like the bracket member 80, the bracket member 180 has a flange portion 181 extending radially outwardly over a predetermined radial distance from an upper one of axially opposite open ends of thereof. However, the bracket member 180 axially downwardly extends more than the bracket member 80 of the engine mount 10, and has, in its axially lower end portion, a small-diameter portion 176 in which the diameter of the bracket member 180 is slightly smaller than that of the other axial portion of the bracket member 180. The bracket member 180 further has an integrally-formed, annular radial projection 178 which extends radially inwardly over a predetermined radial distance from the axially lower open end of the bracket member 180 and which extends circumferentially over the entire circumference of the bracket member 180. The rigid wall member 68 and the elastic wall member 70 are fixed to the bracket member 180, with the annular fitting member 82 being press-fitted in the small-diameter portion 176 of the bracket member 180, so that the actuator 66 is directly attached to the bracket member 80. The construction of the engine mount 110 is more simplified owing to the reduced number of required elements, than that of the engine mount 10 of the first embodiment.

Figure 6:
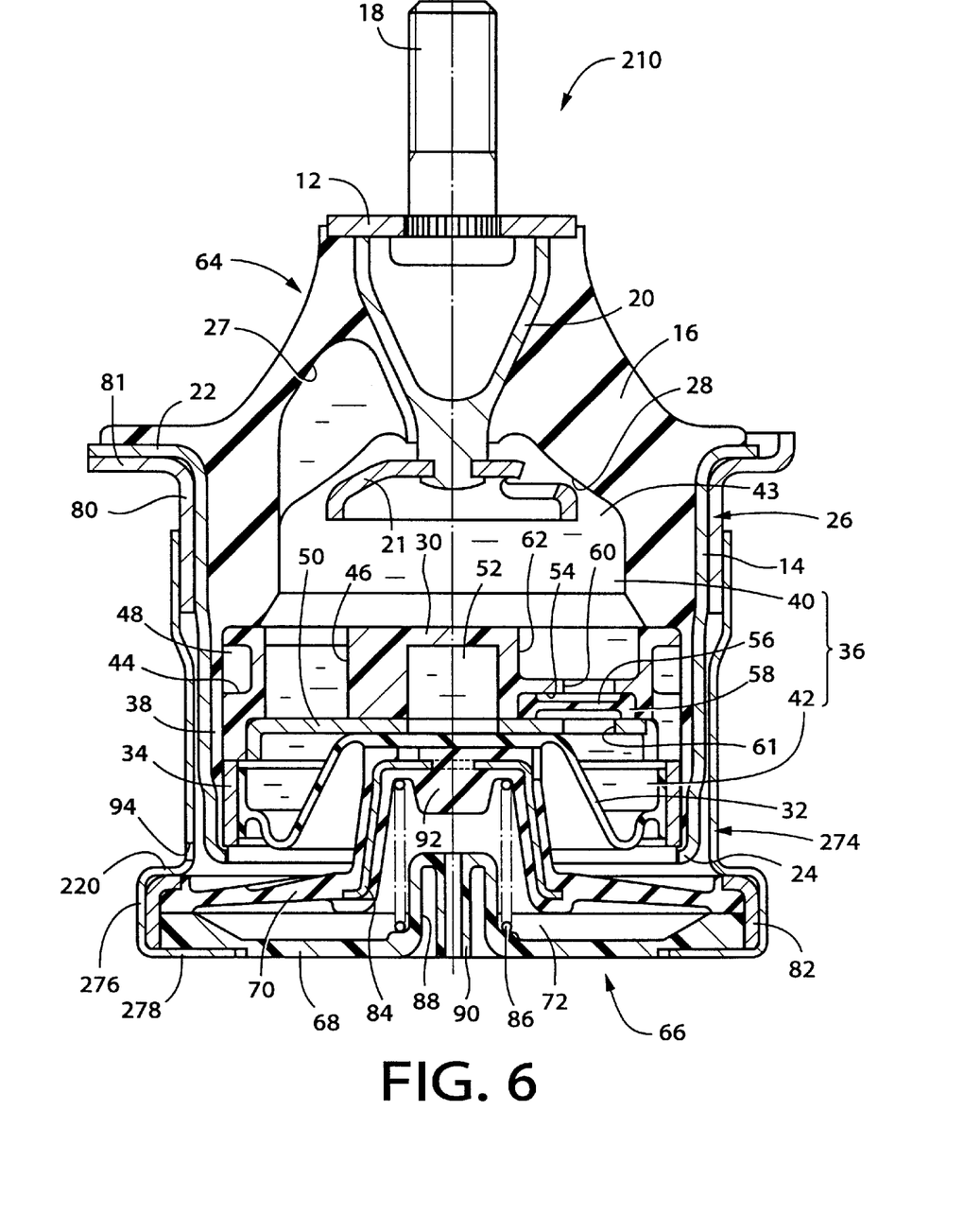
FIG. 6 is an elevational view in transverse cross section of an engine mount according to a third embodiment of this invention.
Figure 7:
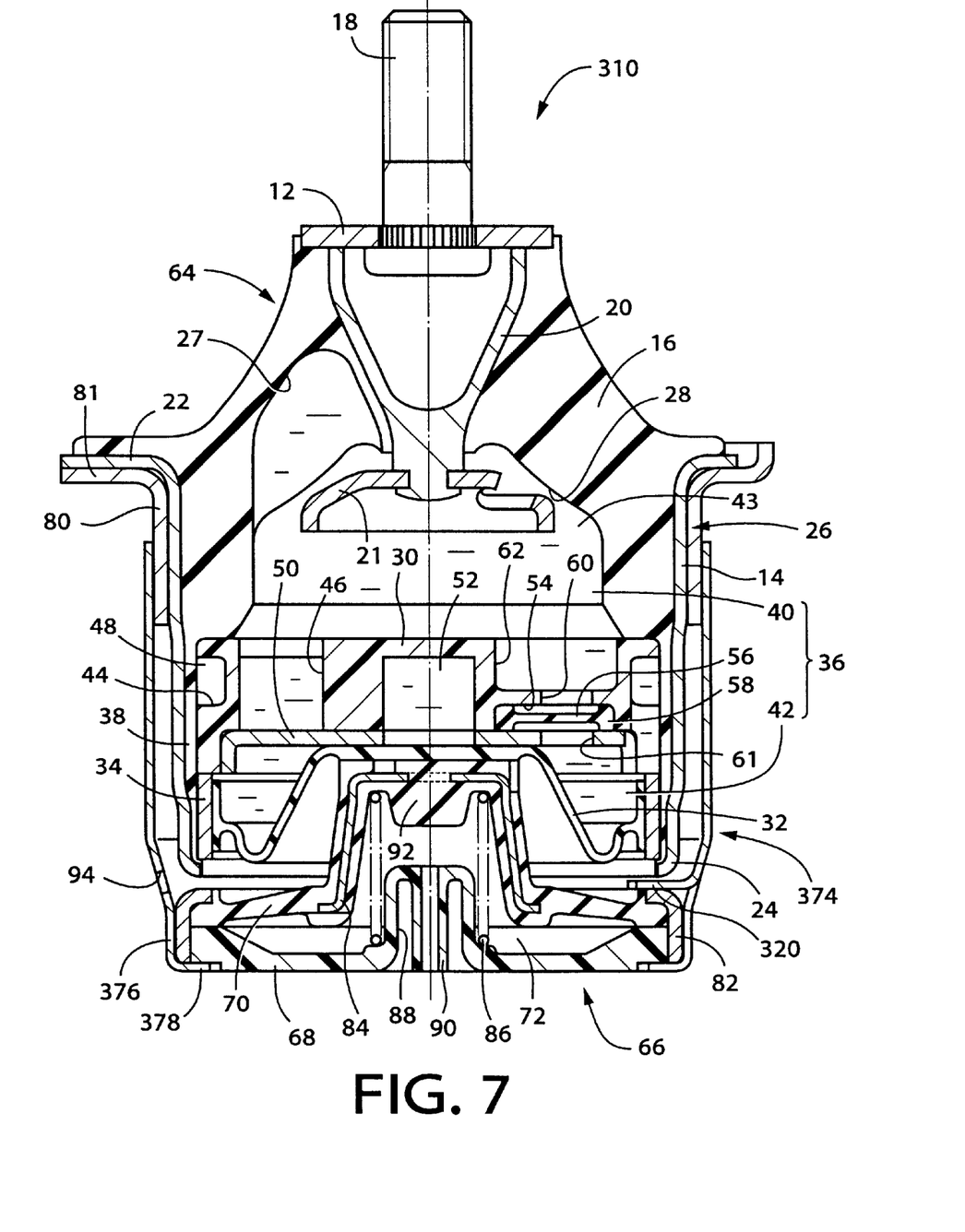
FIG. 7 is an elevational view in transverse cross section of an engine mount according to a fourth embodiment of this invention.
Figure 8:
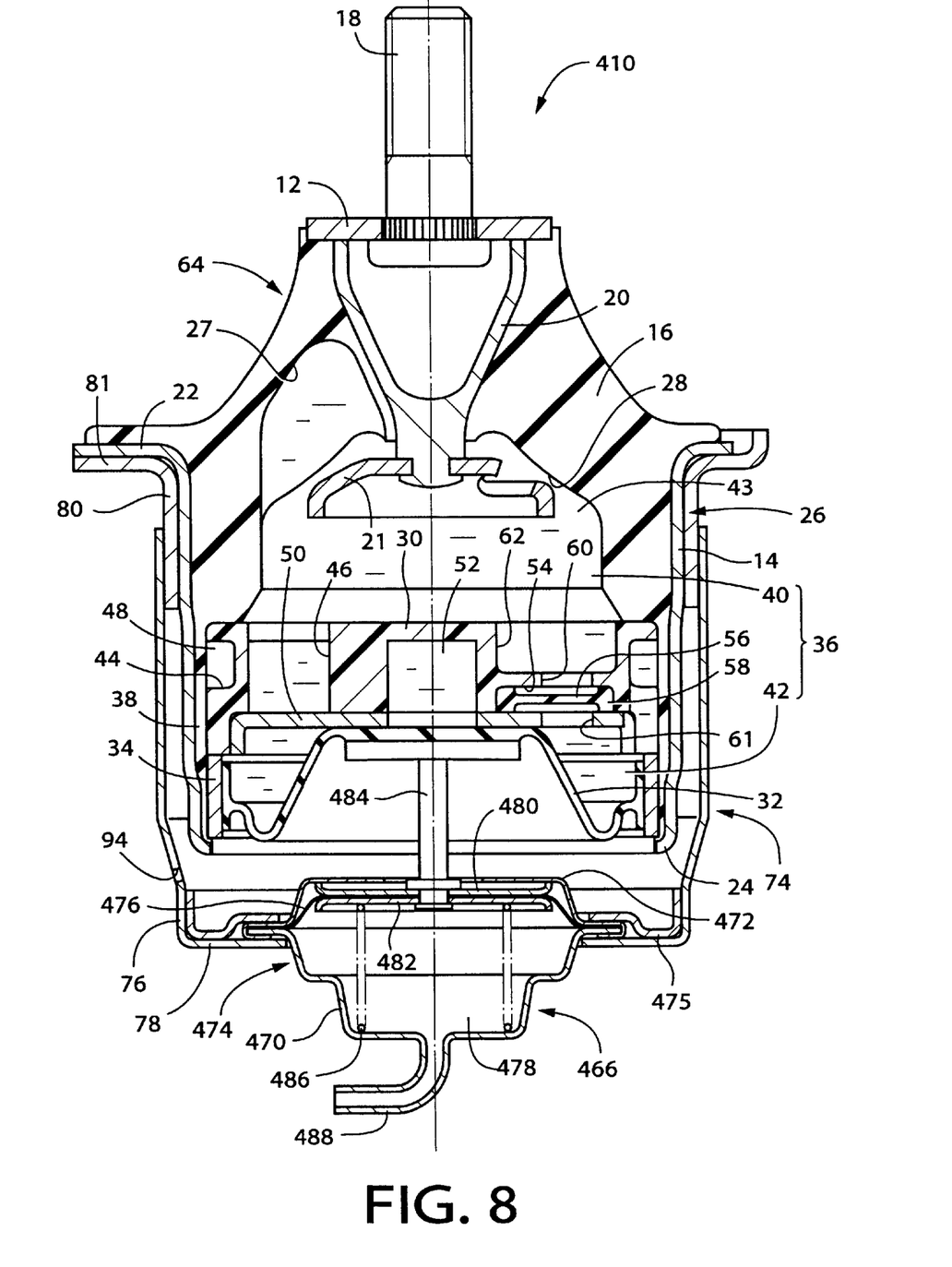
FIG. 8 is an elevational view in transverse cross section of an engine mount according to a fifth embodiment of this invention.

Referring next to FIGS. 6–8, there will be described engine mounts 210, 310, 410 constructed according to third, fourth and fifth embodiments of this invention, respectively. In FIGS. 6–8, the same reference numerals as used in the first embodiment will be used to identify the functionally corresponding elements.

In the engine mount 210 of the third embodiment, the connector is constituted by the bracket member 80 and a tubular member 274, as shown in FIG. 6. Like the tubular member 74, the tubular member 274 has an integrally-formed, annular radial projection 278 which extends radially inwardly over a predetermined radial distance from the axially lower open end of the tubular member 274 and which extends circumferentially over the entire circumference of the tubular member 274. The tubular member 274 is different from the tubular member 74 of the engine mount 10, in respect to the axially lower end portion. That is, the tubular member 274 has, in the axially lower end portion, a large-diameter portion 276 in place of the small-diameter portion 76. Thus, the tubular member 274 has, in its axially intermediate portion, a shoulder portion 220 which is opposed to the annular radial projection 278 in the axial direction. The rigid wall member 68 and the elastic wall member 70 (the annular fitting member 82) are accommodated in the large-diameter portion 276, and are gripped at their respective outer peripheral portions by and between the shoulder portion 220 and the annular radial projection 278 which is caulked onto the outer peripheral portion of the rigid wall member 68, whereby the rigid wall member 68 and the elastic wall member 70 are fixed to the tubular member 274.

In the engine mount 310 of the fourth embodiment, the connector is constituted by the bracket member 80 and a tubular member 374, as shown in FIG. 7. The tubular member 374 has a small-diameter portion 376 in its axially lower end portion, and a radially projecting portion 378 extending radially inwardly from its axially lower open end. A circumferential wall of the small-diameter portion 376 is cut along a plurality of axially-extending lines which are spaced apart from each other in the circumferential direction, whereby the circumferential wall is separated into a plurality of portions which are separated from each other in the circumferential direction. Then, every second of the circumferentially separated portions, as counted in the circumferential direction, is radially inwardly bent, so that a plurality of radially inward projections 320 which are circumferentially spaced apart from each other are provided at an axially upper end of the small-diameter portion 376, and so that the radially projecting portion 378 is constituted by a plurality of radial projections 378 which are circumferentially spaced apart from each other. The rigid wall member 68 and the elastic wall member 70 (the annular fitting member 82) are accommodated in the small-diameter portion 376, and are gripped at their respective outer peripheral portions by and between the radially inward projections 320 and the radial projections 378 which are caulked onto the outer peripheral portion of the rigid wall member 68.

In the engine mounts 210, 310 of the third and fourth embodiments, the rigid and elastic wall members 68, 70 are more firmly fixed at their respective outer peripheral portions to the tubular member 274 or 374, further increasing a strength of the attachment of the actuator 66 to the main body 64, and accordingly further improving the operating reliability of the engine mount.

The engine mount 410 of the fifth embodiment has a pneumatic actuator 466 which is different in construction from the pneumatic actuator 66 of each of the above-described engine mounts 10, 110, 210, 310. The pneumatic actuator 466 has a hollow housing 474 which is constituted by a generally cup-shaped, lower-part member 470 and a generally inverted-cup-shaped, upper-part member 472 each of which is made of a metallic material. The two members 470, 472 are superposed on each other, and are fixed to each other with their respective outer peripheral portions being caulked onto each other. The hollow housing 474 is positioned relative to the tubular member 74 such that the outer peripheral caulked portion of the housing 474 is superposed on the annular radial projection 78 of the tubular member 74. The hollow housing 474 is gripped at the outer peripheral caulked portion by and between the annular radial projection 78 and an annular-plate-shaped fitting member 475 which is press-fitted in the small-diameter portion 76 of the tubular member 74, so that the hollow housing 474 is fixed to the tubular member 74.

Within the hollow housing 474, there is disposed a diaphragm 476 formed of a rubber sheet which is easily deformable. The diaphragm 476 is gripped at its outer peripheral portion by and between the outer peripheral caulked portions of the respective lower- and upper-part members 470, 472, so that an internal space of the hollow housing 474 is divided by the diaphragm 476 into two sections which are arranged in the axial direction. A lower one of the two sections serves as a working air chamber 478. Two working plates 480, 482, each of which is made of a rigid material, are superposed on and bonded to respective opposite end surfaces of a central portion of the diaphragm 476. A pressing member in the form of pressing rod 484 is fixed to the working plates 480, 482 so as to project upwardly from central portions of the respective working plates 480, 482. The pressing rod 484, as well as the working plates 480, 482, is upwardly biased by a coil spring 486 which is accommodated in the working air chamber 478, so that the central portion of the diaphragm 32 is pressed by the pressing rod 484 in the upward direction, so as to be forced onto the partition member 30. When the vacuum pressure is supplied to the working air chamber 478 through a port 488 formed in the lower-part member 470, the pressing rod 484, as well as the working plates 480, 482, is retracted downwardly by suction of the vacuum pressure against the biasing force of the coil spring 486. It is noted that the lower part member 470 and the diaphragm 476 of the actuator 466 functionally correspond to the rigid wall member 68 and the elastic wall member 70 of the actuator 66, respectively. Similarly, the annular-plate-shaped fitting member 475 of the actuator 466 functionally corresponds to the annular fitting member 82 of the actuator 66.

The engine mount 410, equipped with the pneumatic actuator 466 that is different from the pneumatic actuator 66, exhibits substantially the same damping effect and advantages as the engine mounts 10, 110, 210, 310.

While the present invention has been described in its preferred embodiments, the present invention may be otherwise embodied.

In each of the engine mounts 10, 110, 210, 310, 410, for example, the pressure-receiving and equilibrium chambers 40, 42 are communicated to each other by a plurality of orifice passages. However, the pressure-receiving and equilibrium chambers may be communicated to each other by a single orifice passage, which is alternately opened and closed by an actuator whereby the damping characteristics of the engine mount are suitably controlled or changed.

While the elastic body 16 has at least two pocket-like voids 27 in each of the engine mounts 10, 110, 210, 310, 410, the elastic body may have a single pocket-like void 27.

While each of the above-illustrated embodiments of this invention takes the form of the engine mount for a motor vehicle, the principle of the invention is equally applicable to various types of vibration damping devices such as a body mount for a motor vehicle, and also to vibration damping devices used in apparatus and equipment other than the motor vehicles.

It is to be understood that the present invention may be embodied with various other changes, modifications and improvements, which may occur to those skilled in the art, without departing from the spirit and scope of the invention defined by the following claims:

What is claimed is:

1. A fluid-filled vibration damping device comprising:
   a first mounting member;
   a second mounting member which has a generally tubular shape and which is spaced apart from said first mounting member in an axial direction of said second mounting member, said second mounting member having axially opposite open ends, one of which is open toward said first mounting member;
   an elastic body which elastically connects said first and second mounting members, and which fluid-tightly closes said one of the axially opposite open ends of said second mounting member;
   a movable member which is displaceable in said axial direction, and which fluid-tightly closes the other of the axially opposite open ends of said second mounting member so as to cooperate with said second mounting member and said elastic body to define a fluid-tight space filled with a non-compressible fluid; and
   an actuator which displaces said movable member in said axial direction so as to control damping characteristics of said vibration damping device, and which is disposed on one of axially opposite sides of said second mounting member which is remote from said first mounting member, said actuator being disposed on one of opposite sides of said movable member which is remote from said fluid-tight space; wherein the improvement comprises:
   said actuator being provided with a connector which connects said actuator with said second mounting member, said connector having a generally tubular shape and extending from said actuator in a direction toward said one of the axially opposite open ends of said second mounting member, said connector being fitted on an outer circumferential surface of said second mounting member so that said actuator is fixed relative to said second mounting member.

2. A fluid-filled vibration damping device according to claim 1, wherein said actuator is fixed to said connector which is formed independently of said actuator.

3. A fluid-filled vibration damping device according to claim 1, wherein said actuator includes a portion which is formed integrally with said connector.

4. A fluid-filled vibration damping device according to claim 1, wherein said movable member includes an elastic rubber sheet which is elastically deformable so as to be displaceable in said axial direction, and wherein said elastic rubber sheet is fixed at an outer periphery thereof to a fitting ring which is fitted in an inner circumferential surface of said second mounting member.

5. A fluid-filled vibration damping device according to claim 1, wherein said second mounting member has, at said other of the axially opposite open ends, an annular engaging portion which extends radially inwardly from an inner circumferential surface of said second mounting member, and wherein said movable member is fixed at an outer circumferential surface thereof to a support member so as to be supported by said support member, displaceably relative to said second mounting member in said axial direction, said support member being disposed in an axial portion of said second mounting member which is located axially inwardly of said annular engaging portion, said support member being fitted in said axial portion by reduction of a diameter of said axial portion, so that said support member is fixed to said second mounting member.

6. A fluid-filled vibration damping device according to claim 1, wherein said actuator includes a rigid wall member, an elastic wall member which is opposed to said rigid wall member and is nearer to said second mounting member in said axial direction than said rigid wall member and which cooperates with said rigid wall member to define a working air chamber therebetween, a pressing member which is made of a hard material and which is fixed in a central portion of said elastic wall member, an annular fitting member which is fixed to an outer peripheral portion of said elastic wall member, and a biasing member which biases said pressing member in a direction away from said rigid wall member, wherein said working air chamber is connectable to a source of a vacuum pressure so that said pressing member is displaced in a direction toward said rigid wall member by suction of the vacuum pressure against a biasing force of said biasing member when the vacuum pressure is applied to said working air chamber, and wherein said annular fitting member is fitted in said connector so that said actuator is fixed to said connector.

7. A fluid-filled vibration damping device according to claim 6, wherein said rigid wall member is formed integrally with said connector.

8. A fluid-filled vibration damping device according to claim 6, wherein said rigid wall member has, in a central portion thereof, a concave portion which is concave toward said elastic wall member, and an axial projection which projects from a bottom wall of said concave portion in a direction away from said elastic wall member and which has a through-hole for communication between said working air chamber and the exterior of said vibration damping device, said axial projection serving as a joint to which a conduit connected to the vacuum pressure source is connected, so that the vacuum pressure is applied to said working air chamber through said through-hole.

9. A fluid-filled vibration damping device according to claim 8, wherein said elastic wall member has, in the central portion, a stop member which is made of an elastic material and which projects toward said bottom wall of said concave portion of said rigid wall member, so that said stop member is brought into abutting contact with said bottom wall of said concave portion so as to limit an amount of axial displacement of said pressing member toward said rigid wall member in a cushioning manner, when said pressing member is displaced in the direction toward said rigid wall member.

10. A fluid-filled vibration damping device according to claim 1, wherein said second mounting member has a flange portion which extends radially outwardly from said one of the axially opposite open ends of said second mounting member, and wherein said connector is held in contact, at one of axially opposite open ends thereof remote from said actuator, with said flange portion of said second mounting member, so that said connector is held in a predetermined axial position relative to said second mounting member.

11. A fluid-filled vibration damping device according to claim 10, wherein said connector has a flange portion which extends radially outwardly from said one of the axially opposite open ends of said connector, so that said connector is held in contact, at said flange portion of said connector, with said flange portion of said second mounting member.

12. A fluid-filled vibration damping device according to claim 1, wherein said second mounting member has a fitting portion at which said second mounting member is fitted in said connector, and a small-diameter portion which has an outside diameter smaller than that of said fitting portion and which is axially nearer to said other of the axially opposite open ends of said second mounting member than said fitting portion.

13. A fluid-filled vibration damping device according to claim 12, wherein said second mounting member further has a tapered portion which is located between said fitting portion and said small-diameter portion as viewed in said axial direction and which has an outside diameter that increases as said second mounting member extends in a direction away from said actuator toward said first mounting member.

14. A method of manufacturing the fluid-filled vibration damping device defined in claim 1, comprising:

a step of preparing an integral intermediate assembly in which said first and second mounting members are bonded to said elastic body by vulcanization of an unvulcanized material to form said elastic body;

a step of immersing said integral intermediate assembly and said movable member in a mass of said non-compressible fluid, and fitting said movable member into said second mounting member within the mass of said non-compressible fluid, so that said fluid-tight space is filled with said non-compressible fluid;

a step of reducing a diameter of said second mounting member, such that said movable member is fixed to said second mounting member, and such that said other of the axially opposite open ends of said second mounting member is fluid-tightly closed;

a step of preparing said actuator which is provided with said connector; and a step of fitting said connector onto said outer circumferential surface of said second mounting member in an atmosphere, so that said actuator is fixed relative to said second mounting member.

15. A method of manufacturing the fluid-filled vibration damping device defined in claim 13, comprising:

a step of fitting said connector onto said outer circumferential surface of said second mounting member, by introducing said small-diameter portion, said tapered portion and said fitting portion of said second mounting member in the order of description into said connector through one of axially opposite open ends of said connector which is remote from said actuator, so that said actuator is fixed relative to said second mounting member.

16. A fluid-filled vibration damping device comprising:

a first mounting member;

a second mounting member which has a generally tubular shape and which is spaced apart from said first mounting member in an axial direction of said second mounting member, said second mounting member having axially opposite open ends, one of which is open toward said first mounting member;

an elastic body which elastically connects said first and second mounting members, and which fluid-tightly closes said one of the axially opposite open ends of said second mounting member;

a movable member which is displaceable in said axial direction, and which fluid-tightly closes the other of the axially opposite open ends of said second mounting member so as to cooperate with said second mounting member and said elastic body to define a fluid-tight space filled with a non-compressible fluid;

an actuator which displaces said movable member in said axial direction so as to control damping characteristics of said vibration damping device, and which is disposed on one of axially opposite sides of said second mounting member which is remote from said first mounting member;

a connector which connects said actuator with said second mounting member, said connector having a generally tubular shape and extending from said actuator in a direction toward said one of the axially opposite open ends of said second mounting member, said connector being fitted on an outer circumferential surface of said second mounting member so that said actuator is fixed relative to said second mounting member; and a partition member fixedly disposed in said fluid-tight space so as to divide said fluid-tight space into a pressure-receiving chamber which is partially defined by said elastic body and which receives vibrations applied to said vibration damping device, and an equilibrium chamber which is partially defined by said movable member and whose volume is variable by displacement of said movable member, said partition member defining an orifice passage which communicates said pressure-receiving chamber and said equilibrium chamber and which has an open end open to said equilibrium chamber, wherein said actuator displaces said movable member between an open position in which said movable member is spaced apart from said partition member to open said open end of said orifice passage, and a closed position in which said movable member is brought in contact with said partition member to close said open end, whereby said damping characteristics of said vibration damping device are controlled.

* * * * *